United States Patent
Deshpande et al.

(10) Patent No.: US 10,586,104 B2
(45) Date of Patent: Mar. 10, 2020

(54) SYSTEM AND METHOD FOR THEME EXTRACTION

(71) Applicant: Tata Consultancy Services Limited, Mumbai (IN)

(72) Inventors: Shailesh Shankar Deshpande, Pune (IN); Balamuralidhar Purushothaman, Bangalore (IN)

(73) Assignee: Tata Consultancy Services Limited, Mumbai (IN)

(*) Notice: Subject to any disclaimer, the term of this patent is extended or adjusted under 35 U.S.C. 154(b) by 117 days.

(21) Appl. No.: 16/041,438

(22) Filed: Jul. 20, 2018

(65) Prior Publication Data
US 2019/0026553 A1 Jan. 24, 2019

(30) Foreign Application Priority Data
Jul. 21, 2017 (IN) .............................. 201721026047

(51) Int. Cl.
*G06K 9/00* (2006.01)
*G06K 9/62* (2006.01)
(Continued)

(52) U.S. Cl.
CPC ......... *G06K 9/00637* (2013.01); *G06F 16/50* (2019.01); *G06K 9/00463* (2013.01);
(Continued)

(58) Field of Classification Search
CPC .......... G06F 16/50; G06N 20/00; G06N 7/00; G06K 9/00463; G06K 9/6269
(Continued)

(56) References Cited

U.S. PATENT DOCUMENTS 9,632,502 B1* 4/2017 Levinson .............. G08G 1/005
9,734,455 B2* 8/2017 Levinson ............ G05D 1/0088
(Continued)

OTHER PUBLICATIONS

M. Liénou, et al., "Semantic Annotation of Satellite Images Using Latent Dirichlet Allocation," *IEEE Geoscience and Remote Sensing Letters*, vol. 7, No. 1, pp. 28-32 (2010).
(Continued)

*Primary Examiner* — Shahriar Behnamian
(74) *Attorney, Agent, or Firm* — Finnegan, Henderson, Farabow, Garrett & Dunner LLP

(57) ABSTRACT

System and method of the present disclosure provide a linguistic approach to image processing. Prior art focused on extracting well-defined single objects occupying large portion of an image area. However, there was no focus on higher level semantics or distribution of object categories within the image. In contrast to imagery by handheld devices, remotely sensed data contains numerous objects because of relative large coverage and distribution over objects is critical to analyzing such large coverage. Accordingly, in the present disclosure, a generative statistical model is defined wherein an aerial image is modelled as a collection of the one or more themes and each of the one or more themes is modelled as a collection of object categories. The model automatically adapts to a scale of the aerial image and appropriately identifies the themes which may be used for applications including monitoring land use, infrastructure management and the like.

20 Claims, 8 Drawing Sheets

(51) Int. Cl.
*G06N 7/00* (2006.01)
*G06N 20/00* (2019.01)
*G06F 16/50* (2019.01)

(52) U.S. Cl.
CPC ....... *G06K 9/00651* (2013.01); *G06K 9/6269* (2013.01); *G06N 7/00* (2013.01); *G06N 20/00* (2019.01)

(58) Field of Classification Search
USPC ........................................................ 382/103
See application file for complete search history.

(56) References Cited

U.S. PATENT DOCUMENTS

| | | | | |
|---|---|---|---|---|
| 2011/0243450 | A1* | 10/2011 | Liu ................... | G06K 9/00577 382/190 |
| 2013/0301915 | A1* | 11/2013 | Terrazas ............ | G06Q 30/0201 382/173 |
| 2015/0268058 | A1* | 9/2015 | Samarasekera .... | G06K 9/00637 701/409 |
| 2016/0358190 | A1* | 12/2016 | Terrazas ................. | G06F 16/29 |

OTHER PUBLICATIONS

B.C. Russell, *Labeling, Discovering, and Detecting Objects in Images* (Doctoral dissertation 2001); 138 pages. Retrieved from http://bryanrussell.org/papers/RussellThesis.pdf.
P. Xie, et al., "Mining User Interests from Personal Photos," *Proceedings of the 29th AAAI Conference on Artificial Intelligence* (Austin, TX, Jan. 25-30, 2015); 7 pages.

* cited by examiner

SYSTEM AND METHOD FOR THEME EXTRACTION

PRIORITY CLAIM

This U.S. patent application claims priority under 35 U.S.C. § 119 to: Indian Patent Application No. 201721026047, filed on 21 Jul. 2017. The entire contents of the aforementioned application are incorporated herein by reference.

TECHNICAL FIELD

The disclosure herein generally relates to image processing, and, more particularly, to extracting themes from an aerial image.

BACKGROUND

In the field of image processing, linguistic approaches provide semantic understanding of an image. The linguistic approaches in image processing are applicable to identify objects from a given image by extracting information from the image having wide distribution of information. For example, an image including a container infrastructure and an urban open space may be used for managing port cities. Moreover, extracting information like open spaces can be used to determine urban health.

In conventional methods, "word" and "topic" analogies were applied to the image having well defined single objects occupying a large portion of an image area by using certain techniques. For example, single objects include car, bike, face, boat etc. Generally, the images captured remotely include numerous objects because of large coverage and distribution of objects. The conventional image processing techniques face challenges in analyzing the large coverage and distribution of objects.

SUMMARY

Embodiments of the present disclosure present technological improvements as solutions to one or more of the above-mentioned technical problems recognized by the inventors in conventional systems.

In an aspect, there is provided a processor implemented method comprising: receiving, by one or more hardware processors, the aerial image pertaining to an observation area; defining, by the one or more hardware processors, a generative statistical model wherein the aerial image is modelled as a collection of the one or more themes and each of the one or more themes is modelled as a collection of object categories; dividing, by the one or more hardware processors, the aerial image into a plurality of non-overlapping sub-images, the plurality of non-overlapping sub-images representing a plurality of visual documents, wherein each of the plurality of visual documents has a first predefined size; dividing, by the one or more hardware processors, each of the plurality of visual documents into one or more patches of a second predefined size, the one or more patches being representative of visual words; labeling, by the one or more hardware processors, the one or more patches with an associated object category using supervised machine learning; identifying, by the one or more hardware processors, a theme associated with each of the one of more patches in each of the plurality of visual documents using the generative statistical model via unsupervised machine learning, wherein the generative statistical model automatically adapts to a scale of the aerial image and the identified theme corresponds to the scale of the aerial image; clustering, by the one or more hardware processors, the plurality of visual documents based on similarity of the identified theme to extract the one or more themes; and visualizing, by the one or more hardware processors, the one or more themes by choosing a most probable object category for each of the one or more themes and assigning a color code for each of the one or more patches.

In another aspect, there is provided a system comprising: one or more data storage devices operatively coupled to the one or more processors and configured to store instructions configured for execution by the one or more processors to: receive an aerial image pertaining to an observation area; define a generative statistical model wherein the aerial image is modelled as a collection of the one or more themes and each of the one or more themes is modelled as a collection of object categories; divide the aerial image into a plurality of non-overlapping sub-images, the plurality of non-overlapping sub-images representing a plurality of visual documents, wherein each of the plurality of visual documents has a first predefined size; divide each of the plurality of visual documents into one or more patches of a second predefined size, the one or more patches being representative of visual words; label the one or more patches with an associated object category using supervised machine learning; identify a theme associated with each of the one of more patches in each of the plurality of visual documents using the generative statistical model via unsupervised machine learning, wherein the generative statistical model automatically adapts to a scale of the aerial image and the identified theme corresponds to the scale of the aerial image; cluster the plurality of visual documents based on similarity of the identified theme to extract the one or more themes; and visualize the one or more themes by choosing a most probable object category for each of the one or more themes and assigning a color code for each of the one or more patches In yet another aspect, there is provided a computer program product comprising a non-transitory computer readable medium having a computer readable program embodied therein, wherein the computer readable program, when executed on a computing device, causes the computing device to: receive an aerial image pertaining to an observation area; define a generative statistical model wherein the aerial image is modelled as a collection of the one or more themes and each of the one or more themes is modelled as a collection of object categories; divide the aerial image into a plurality of non-overlapping sub-images, the plurality of non-overlapping sub-images representing a plurality of visual documents, wherein each of the plurality of visual documents has a first predefined size; divide each of the plurality of visual documents into one or more patches of a second predefined size, the one or more patches being representative of visual words; label the one or more patches with an associated object category using supervised machine learning; identify a theme associated with each of the one of more patches in each of the plurality of visual documents using the generative statistical model via unsupervised machine learning, wherein the generative statistical model automatically adapts to a scale of the aerial image and the identified theme corresponds to the scale of the aerial image; cluster the plurality of visual documents based on similarity of the identified theme to extract the one or more themes; and visualize the one or more themes by choosing a most probable object category for each of the one or more themes and assigning a color code for each of the one or more patches.

In an embodiment of the present disclosure, the one or more hardware processors are further configured to analyze the extracted one or more themes to obtain granular level themes within the extracted one or more themes based on the one or more patches and the associated object category.

In an embodiment of the present disclosure, the first predefined size and the second predefined size are determined empirically.

In an embodiment of the present disclosure, the first predefined size and the second predefined size are based on size of smallest object in the aerial image and pertaining to a theme, wherein the second predefined size represents number of rows and columns m×n based on the average length of the smallest object in the aerial image and spatial resolution of the aerial image and the first predefined size is a multiple of the second predefined size.

In an embodiment of the present disclosure, the smallest object in the aerial image is identified based on either statistical properties of objects comprised in the received aerial image or based on a pre-defined knowledge base of objects pertaining to the observation area.

In an embodiment of the present disclosure, the second predefined size is obtained by dividing the average length of the smallest object by the spatial resolution of the aerial image and the first predefined size is eight to ten times the second predefined size.

In an embodiment of the present disclosure, the supervised learning uses Support Vector Machines (SVM) and the generative statistical model is Latent Dirichlet Allocation (LDA).

In an embodiment of the present disclosure, the one or more hardware processors are further configured to identify a theme associated with each of the one of more patches by creating a distribution vector associated with each of the identified themes in each of the plurality of visual documents, wherein the distribution vector is indicative of a statistical distribution of a corresponding theme over associated one or more patches.

In an embodiment of the present disclosure, the one or more hardware processors are further configured to identify a theme associated with each of the one of more patches by assigning random themes to the one or more patches iteratively until the statistical distribution of the theme over the associated one or more patches is stable.

In an embodiment of the present disclosure, the one or more hardware processors are further configured to cluster the plurality of visual documents is based on K-means algorithm and the distribution vector associated with each of the identified themes are feature vectors.

In an embodiment of the present disclosure, the similarity of the identified theme is evaluated using Silhouette coefficient.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Figure 1:
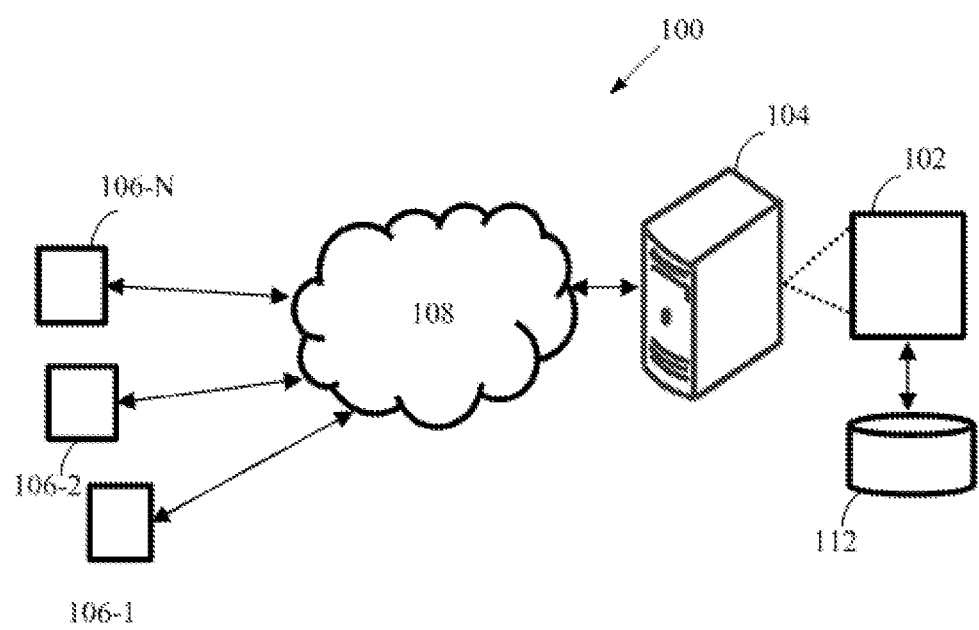
FIG. 1 illustrates a networking environment implementing theme extraction in accordance with an embodiment of the present subject matter.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Linguistic approach to image processing is a booming research area. The conventional methods used image grammar. In image grammar, a set of structural relationship between image parts is utilized for automatic processing of images. Moreover, conventional methods focus on vector space models with visual "words" for image processing. Further, conventional methods utilize "word" and "topic" analogies for processing an image. But, the conventional methods are able to process single large objects present in the image and face challenges to process the image with huge distribution of objects or image with large ground coverage, for example, aerial images. For brevity of description, hereinafter the term "pixel" and "patch" may be alternatively referred to as "word". For brevity of description, herein after the term "image" and the term "document" may be used interchangeably. Similarly, for brevity of description, herein after the term "theme" and the term "topic" may be used interchangeably.

Various embodiments of the present disclosure provide methods and systems for extracting one or more themes from an aerial image. In accordance with the present disclosure, the theme extraction may be performed in two steps—1) Learning object category and 2) Learning generative model parameters. The step 1 may be performed by a) converting the image into a set of pixels and thereby into a set of patches b) representing each pixel an thereby each patch as a "word" and c) learning the object categories associated with each "word" by utilizing a supervised machine learning approach. Further, the step 2 may be performed by utilizing an unsupervised machine learning technique, for example Latent Dirichlet Allocation (LDA). The combination of the supervised and the unsupervised machine learning techniques provides efficient extraction of one or more themes from the image. A detailed description of the above described method for extracting one or more themes from an aerial image is shown with respect to illustrations represented with reference to FIGS. 1 through 5.

Referring now to the drawings, and more particularly to FIG. 1 through FIG. 5, where similar reference characters denote corresponding features consistently throughout the figures, there are shown preferred embodiments and these embodiments are described in the context of the following exemplary system and/or method.

FIG. 1 illustrates a networking environment 100 implementing theme extraction in accordance with an embodiment of the present disclosure. A system 102 is configured to receive an aerial image and extract one or more themes from the aerial image in accordance with the present disclosure. The system 102 may be embodied in a computing device, for instance a computing device 104. In an embodiment, the aerial image is represented as a collection of one or more themes. The one or more themes may be one or more land use classes. The land use classes may include shops, business and industrial activities, hotels, hostels, dwelling areas and non-residential areas. In another embodiment, each theme among the one or more themes may be represented as a set of materials, for example vegetation, soil and concrete. Every theme among the one or more themes may include one or more objects category. Every object category may include one or more geometric shapes. Further, a process that may be considered analogous to a textual generative process is performed on the aerial image. Here, the aerial image may be considered analogous to a "document". Every theme among the one or more themes may be considered analogous to a "topic" and every object category among the one or more object categories may be considered analogous to a "word". The generative process is further explained in the following steps.

Step 1: For every image I among the plurality of images $\{I(1), \ldots, I(M)\}$ Step 2: Draw a K-dimensional theme weight vector $\Theta(m)$ from the distribution $p(\Theta|\alpha)$=Direchlet $(\alpha)$ ($\alpha$ is a hyper-parameter), where p refers to probability.

Step 3: For each P in the collection of patches (sub-images of a received aerial image) $\{P(1), \ldots, P(N)\}$
   a. Draw a theme $z(n)$ from the categories $\{1, \ldots, K\}$ from the multinomial distribution $p(z(n)=k|\Theta(m))=\Theta(m)(k)$
   b. Given the chosen theme $z(n)$, draw an object (or object category) $x(n)$ from the probability distribution $p(x(n)=i|z(n)=j,\beta)=\beta(i)(j)$ ($\beta$ is an hyper parameter).

Although the present disclosure is explained considering that the system 102 is implemented on a server, it may be understood that the system 102 may also be implemented in a variety of computing systems, such as a laptop computer, a desktop computer, a notebook, a workstation, a cloud-based computing environment and the like. In one implementation, the system 102 may be implemented in a cloud-based environment. It will be understood that the system 102 may be accessed by multiple users through one or more user devices 106-1, 106-2 . . . 106-N, collectively referred to as user devices 106 hereinafter, or applications residing on the user devices 106. Examples of the user devices 106 may include, but are not limited to, a portable computer, a personal digital assistant, a handheld device, a Smartphone, a Tablet Computer, a workstation and the like. The user devices 106 are communicatively coupled to the system 102 through a network 108.

In an embodiment, the network 108 may be a wireless or a wired network, or a combination thereof. In an example, the network 108 may be implemented as a computer network, as one of the different types of networks, such as virtual private network (VPN), intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network 108 may include a variety of network devices, including routers, bridges, servers, computing devices, storage devices. The network devices within the network 108 may interact with the system 102 through communication links.

In an embodiment, the system 102 may be implemented in a computing device 104, such as a hand-held device, a laptop or other portable computer, a tablet computer, a mobile phone, a PDA, a smartphone, and a desktop computer. The system 102 may also be implemented in a workstation, a mainframe computer, a server, and a network server. In an embodiment, the system 102 may be coupled to a data repository, for example, a repository 112. The repository 112 may store data processed, received, and generated by the system 102. In an alternate embodiment, the system 102 may include the data repository 112. The components and functionalities of the system 102 are described further in detail with reference to FIG. 2.

Figure 2:
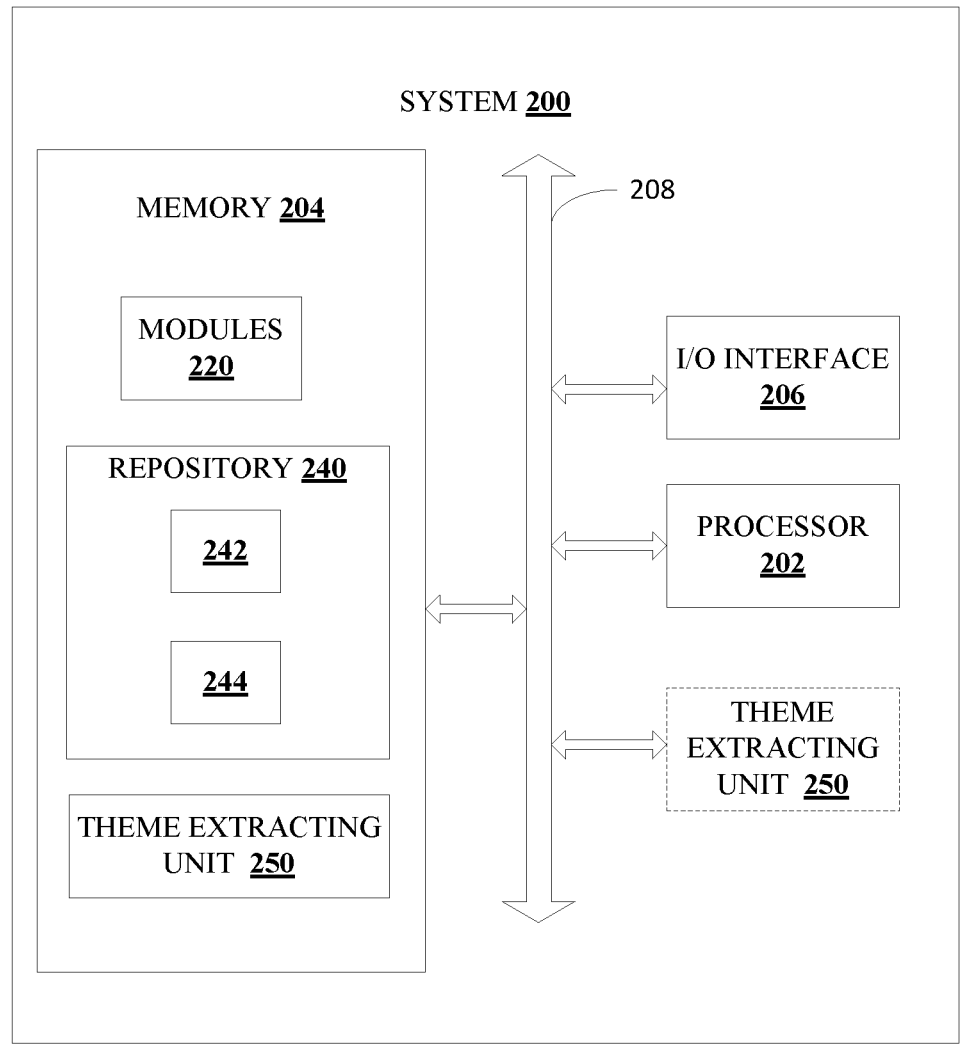
FIG. 2 illustrates a block diagram of system for theme extraction, in accordance with an example embodiment.

FIG. 2 illustrates a block diagram of system 200 for theme extraction, in accordance with an example embodiment. The system for extracting themes from the aerial image (hereinafter referred to as the system 200) may be an example of the system 102 (FIG. 1). In an example embodiment, the system 200 may be embodied in, or is in direct communication with the system, for example the system 102 (FIG. 1). The system 200 includes or is otherwise in communication with one or more hardware processors such as a processor 202, at least one memory such as a memory 204, and an I/O interface 206 and a theme extracting unit 250. In an embodiment, the theme extracting unit 250 may be implemented as a standalone unit in the system 200. In another embodiment, theme extracting unit 250 may be implemented as a module in the memory 204. The processor 202, memory 204, and the I/O interface 206 may be coupled by a system bus such as a system bus 208 or a similar mechanism.

The I/O interface 206 may include a variety of software and hardware interfaces, for example, a web interface, a graphical user interface, and the like. The interfaces 206 may include a variety of software and hardware interfaces, for example, interfaces for peripheral device(s), such as a keyboard, a mouse, an external memory, a camera device, and a printer. Further, the interfaces 206 may enable the system 102 to communicate with other devices, such as web servers and external databases. The interfaces 206 may facilitate multiple communications within a wide variety of networks and protocol types, including wired networks, for example, local area network (LAN), cable, etc., and wireless networks, such as Wireless LAN (WLAN), cellular, or satellite. For the purpose, the interfaces 206 may include one or more ports for connecting a number of computing systems with one another or to another server computer. The I/O interface 206 may include one or more ports for connecting a number of devices to one another or to another server.

The processor 202 may be implemented as one or more microprocessors, microcomputers, microcontrollers, digital signal processors, central processing units, state machines, logic circuitries, and/or any devices that manipulate signals based on operational instructions. Among other capabilities, the processor 202 is configured to fetch and execute computer-readable instructions stored in the memory 204.

The memory 204 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 204 includes a plurality of modules 220 and a repository 240 for storing data processed, received, and generated by one or more of the modules 220. The modules 220 may include routines, programs, objects, components, data structures, and so on, which perform particular tasks or implement particular abstract data types.

The repository 240, amongst other things, includes a system database 242 and other data 244. The other data 244 may include data generated as a result of the execution of one or more modules in the modules 220. The repository 240 is further configured to maintain a plurality of aerial images.

The theme extracting unit 250 of the theme extraction system 200 may be configured to receive the plurality of aerial images. For example, a high resolution aerial image is obtained from multiple sources, by utilizing at least one of multispectral and Light Detection And Ranging (LiDAR). The LiADR is a remote sensing method that uses light in the form of a pulsed laser to measure ranges to the earth. Here, the ranges include variable distances. Further, an object category is assigned to each pixel associated with the one or more images to obtain a set of labelled pixels. In an embodiment, the set of labelled pixels for each object category of interest was collected, for example, 500 to 3000 samples per object category were collected initially. Each pixel is associated with a feature vector and the feature vector of each pixel includes RGBZ values. Here, R, G and B values indicates Red, Green and Blue values obtained from respective multispectral bands and the Z value is from the LiADR. In an embodiment, the Z value may indicate height values obtained from LiADR. In another embodiment, the Z value may be obtained from an infrared band. The set of pixels were split into training and test sets. The training set was used to train a standard Support Vector Machine (SVM) classifier. An entire tile (aerial image) was then classified using the trained classifier. The classification may provide some misclassified regions. The misclassified regions in the image were manually corrected using image processing tools to obtain a reference image.

In an embodiment, the theme extracting unit 250 of the theme extraction system 200 may be configured to convert each aerial image among the plurality of aerial images into a plurality of patches or sub-images. In an embodiment, each patch among the plurality of patches may be a set of pixels in 80 rows×80 columns size. Each image among the one or more images is partitioned into one or more patches of size 80×80 resulting in 15625 non-overlapping patches.

In an embodiment, the theme extracting unit 250 of the theme extraction system 200 may be configured to classify the plurality of patches into a plurality of object categories. The one or more patches are categorized by utilizing the supervised machine learning approach. Here, a set of training patches are selected for each object category. For example, a set of 100 to 150 patches per object category has been selected for training using a Support Vector Machine (SVM) and a set of 1192 patches of eight categories were formed. Further, a feature matrix F of size 1192×25600 is created. Each row of the feature matrix represents a patch with R, G, B, and Z bands stacked side-by-side. The feature matrix F is high dimensional and the high dimensional feature F is converted into a low dimensional feature matrix f of size 1192×15 using Principal Component Analysis (PCA). In an embodiment, the PCA is associated with a set of feature vectors and at least top 15 PCA feature vectors having more than 85% of the variance were selected. The feature matrix having the 15 feature vectors is partitioned into training, validation, and test data. After training, each patch among the set of patches is given an object label using the SVM classifier. Each patch among the set of patches with its object category label was used as a "word" for the LDA experiment at the sub-image level. Accuracy of the SVM classifier for an example embodiment was 84.97% with a standard deviation of 1% as illustrated in Table 1.

TABLE 1

Confusion matrix for object category labels (patch) - Ground truth versus SVM prediction.

| Object | Boat | Car | Container | Greenery | House | Open Area | Road | Water |
|---|---|---|---|---|---|---|---|---|
| Boat | 45 | 9 | 4 | 0 | 0 | 1 | 1 | 0 |
| Car | 7 | 32 | 1 | 0 | 0 | 0 | 0 | 0 |
| Container | 1 | 4 | 59 | 0 | 2 | 1 | 0 | 0 |
| Greenery | 0 | 2 | 0 | 63 | 0 | 0 | 0 | 0 |
| House | 0 | 1 | 2 | 0 | 20 | 1 | 0 | 0 |
| Open Area | 0 | 0 | 0 | 1 | 0 | 42 | 1 | 0 |
| Road | 0 | 0 | 0 | 0 | 0 | 1 | 24 | 0 |
| Water | 0 | 0 | 0 | 0 | 0 | 0 | 0 | 21 |

In an embodiment, the theme extracting unit 250 of the theme extraction system 200 may be configured to identify one or more themes associated with the one or more classified patches. Here, every image among the one or more images may be divided into a plurality of sub-images of m rows and n columns. Every sub-image among the plurality of sub-images has a unique distribution of the one or more themes. Further, a set of information is extracted from the one or more themes. For example, an urban theme includes buildings, cars and open spaces. The distribution of urban theme provides occupancy corresponding to each object class. The plurality of sub-images having same theme distribution are clustered together to obtain a set of clustered sub-images. The set of clustered sub-images indicates a single higher level theme. In an embodiment, each image among the one or more images is partitioned into non-overlapping sub-images of size 560×560 pixels. The size of the document has been selected empirically after several experiments with different document sizes (800×800, 1200×1200, 1600×1600, and 2000×2000). Particularly, a set of 289 sub-images and eight distinct object categories were selected. Each sub-image was represented in the document vector space as an eight dimensional vector of word frequency. Further, a fixed number of topics (estimated empirically) were learnt using LDA model by utilizing the set of sub-images. For each sub-image among the set of sub-images, LDA learnt a distribution over topics. Further, the sub-images (documents) were clustered into a fixed number of themes by utilizing the K-means algorithm with the corresponding topic distributions as the feature vectors. In an embodiment, the cohesiveness of the extracted theme is evaluated using the standard Silhouette coefficient. In an embodiment, if there are multiple number of similar images, a single image may be considered as a document to provide flexibility to adapt to data availability constraints.

Figure 3A:
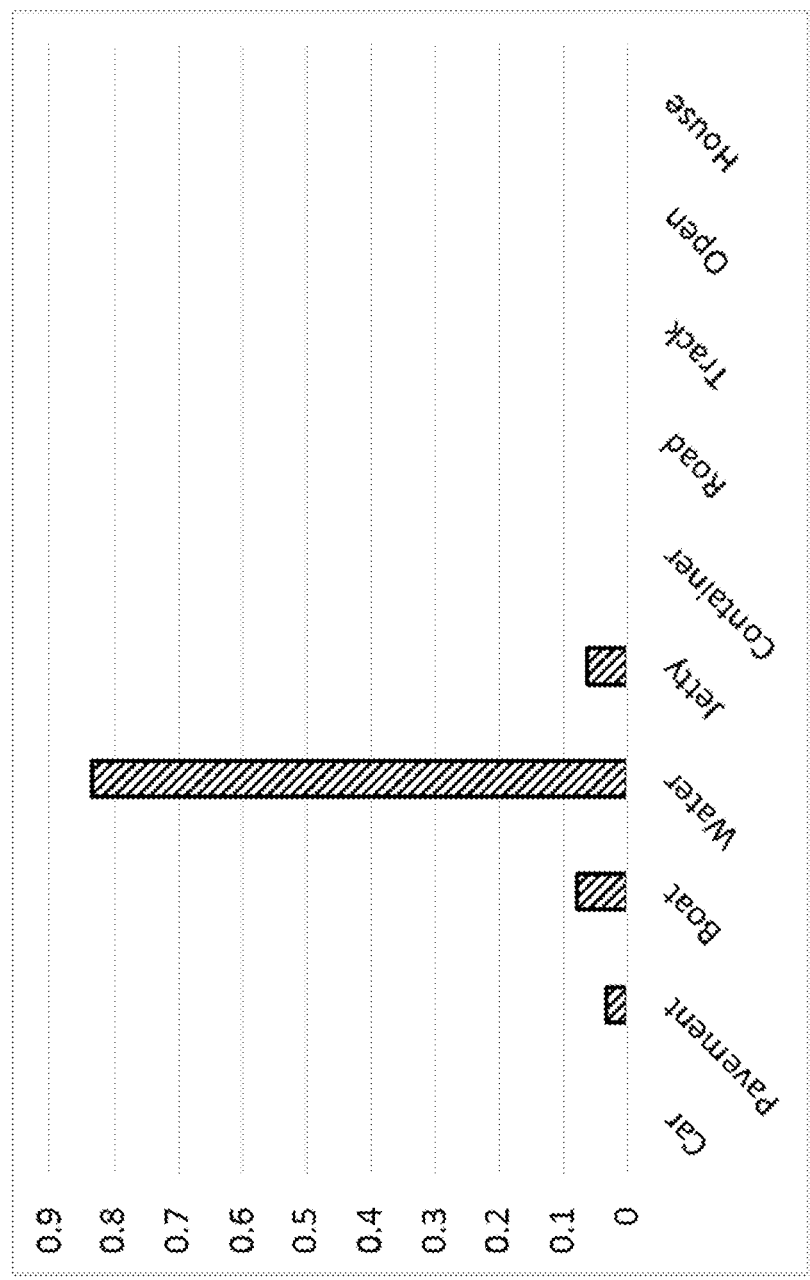
FIG. 3A through FIG. 3C illustrates exemplary theme distributions over object categories in accordance with an embodiment of the present disclosure.
Figure 3B:
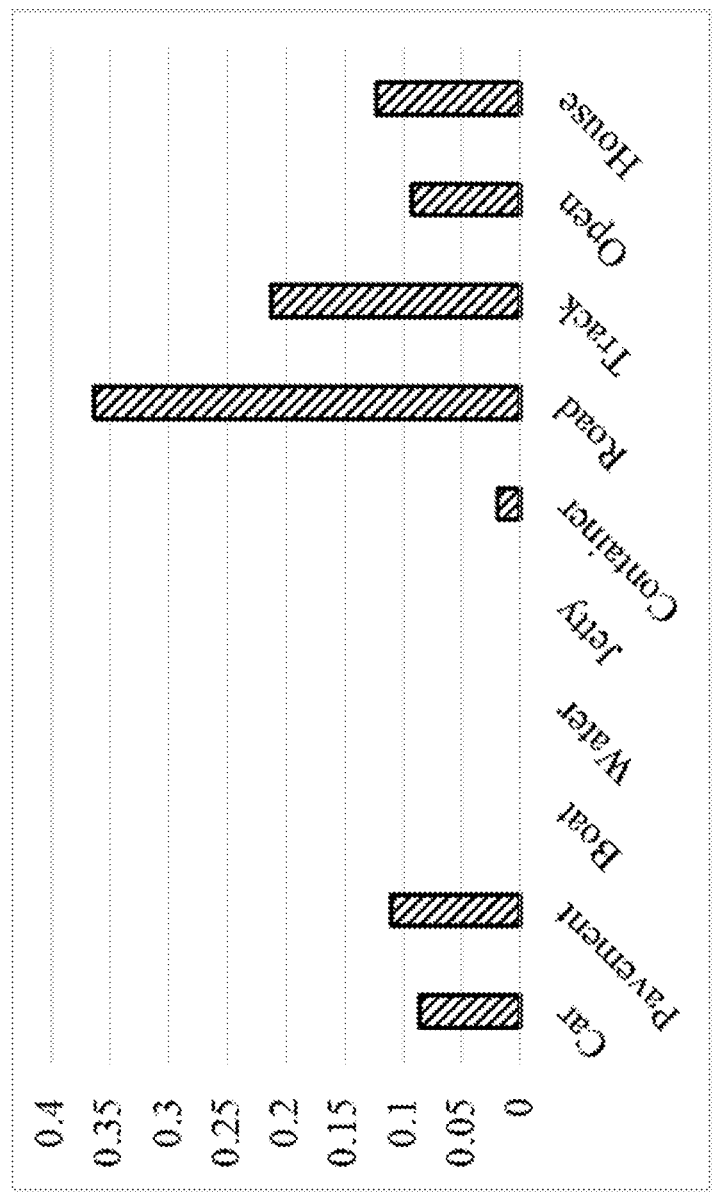
Figure 3C:
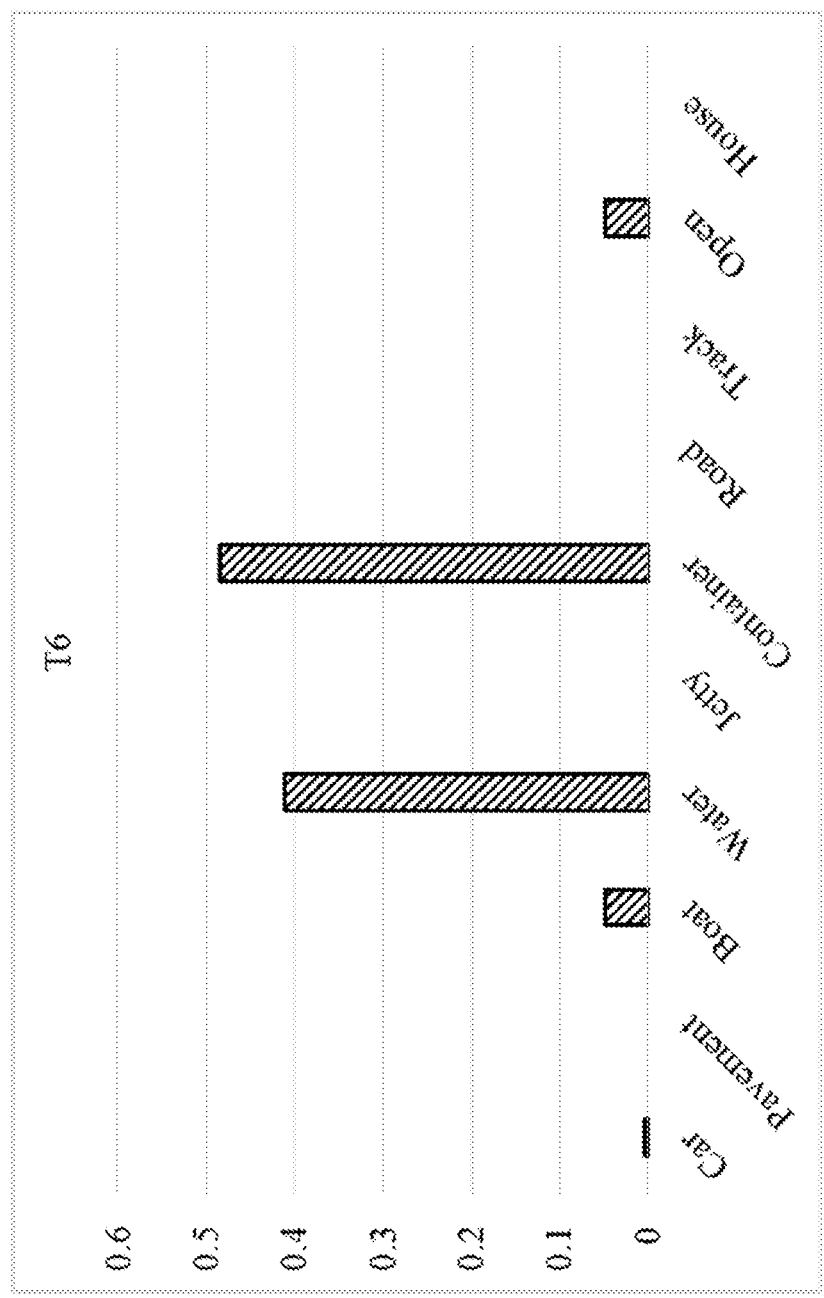

In an embodiment, the theme extracting unit 250 of the theme extraction system 200 may be configured to label the one or more themes based on similarity between a set of topic models associated with the training data and the set of topic models obtained from LDA. FIG. 3A through FIG. 3C illustrates exemplary theme distributions over object categories in accordance with an embodiment of the present disclosure. Particularly, FIG. 3A illustrates a theme distribution corresponding to an aerial image including a port region FIG. 3B illustrates a theme distribution corresponding to an aerial image including an urban region and FIG. 3C illustrates a theme distribution corresponding to an aerial image including a container parking lot. A strong relationship between the topic (theme) and the corresponding word (object category) is evident from these illustrations.

In an embodiment, the theme extracting unit 250 of the theme extraction system 200 may be configured to visualize the themes associated with the plurality of objects categories. Here, the visualization is performed on the set of clustered sub-images by assigning topics to object category associated with the set of clustered sub-images. The assigning of object category indicates the one or more themes associated with a sub-image with a finer resolution object than the single higher level theme. For example, if a parking lot is the higher level theme, an occupied container parking lot can be the finer resolution object. Further, the "word" is assigned to every "topic" assignment by selecting a most probable "word" for the "topic". In an embodiment, in order to visualize the LDA topics the "word" to "topic" assignment may be performed directly by choosing most probable "word" for a given "topic". Each "word" is colour coded accordingly.

In an embodiment, the topic assignments at the patch level were compared with the topic assigned by an expert. The expert was given an aerial image including port region and an aerial image including urban region each with 30×10 patches with patch boundaries. The expert was asked to label each patch with one of the topics shown in Table 2A and 2B. Table 2A illustrates a confusion matrix for "topic" assignment associated with the aerial image including the port region and Table 2B illustrates a confusion matrix for topic assignment associated with aerial image including the urban region.

TABLE 2A

|  | Water Body | Fringe Area | Dock Area | Container | Mislabelled |
|---|---|---|---|---|---|
| Water Body | 45 | 9 | 4 | 0 | 0 |
| Fringe Area | 7 | 32 | 1 | 0 | 0 |
| Dock Area | 1 | 4 | 59 | 0 | 2 |
| Container | 0 | 2 | 0 | 63 | 0 |
| Mislabelled | 0 | 1 | 2 | 0 | 20 |

TABLE 2B

|  | Green | Soil | Road | Urban |
|---|---|---|---|---|
| Green | 45 | 9 | 4 | 0 |
| Soil | 7 | 32 | 1 | 0 |
| Road | 1 | 4 | 59 | 0 |
| Urban | 0 | 2 | 0 | 63 |

It was observed that there was a significant confusion for road and urban topic assignment. This may be due to the difficulty in assigning a discrete "topic" label when a patch has both road and urban areas.

The thematic classes obtained by LDA are useful in addressing several business problems. Table 3 illustrates outcomes associated with different methods, for example ground truth, SVM prediction (patch) and LDA topics (pixel). Now referring to Table 3, row 1 is obtained from ground truth images, row 2 is the output from SVM based supervised learning (patch level), row 3 is the output from LDA topic assignment (pixel level). The LDA output is relatively closer to the baseline output than the SVM output.

TABLE 3

| Method | Green | Soil |
|---|---|---|
| Ground Truth | 45 | 9 |
| SVM prediction (patch) | 7 | 32 |
| LDA topics (pixel) | 1 | 4 |

Figure 4A:
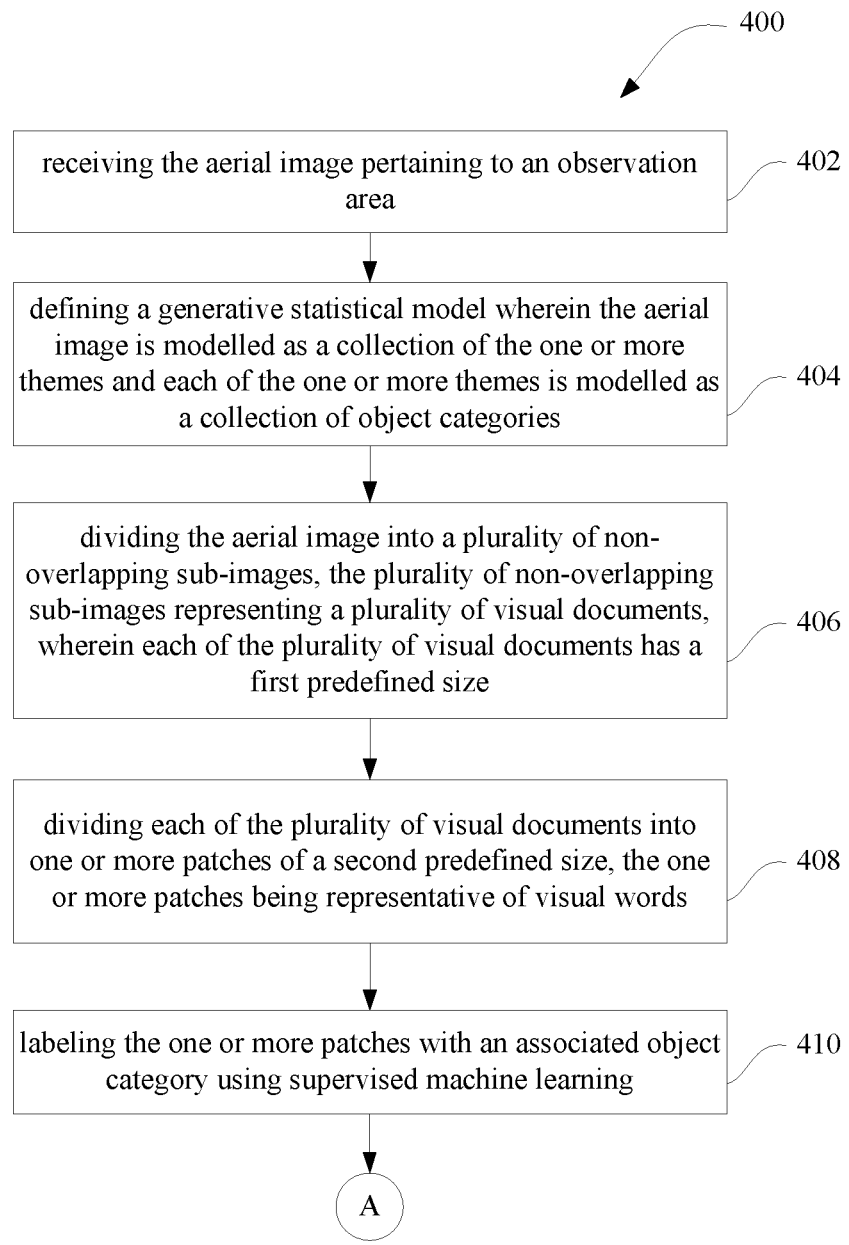
FIG. 4A through FIG. 4B illustrates an exemplary flow diagram for a computer implemented method for theme extraction, in accordance with an embodiment of the present disclosure.
Figure 4B:
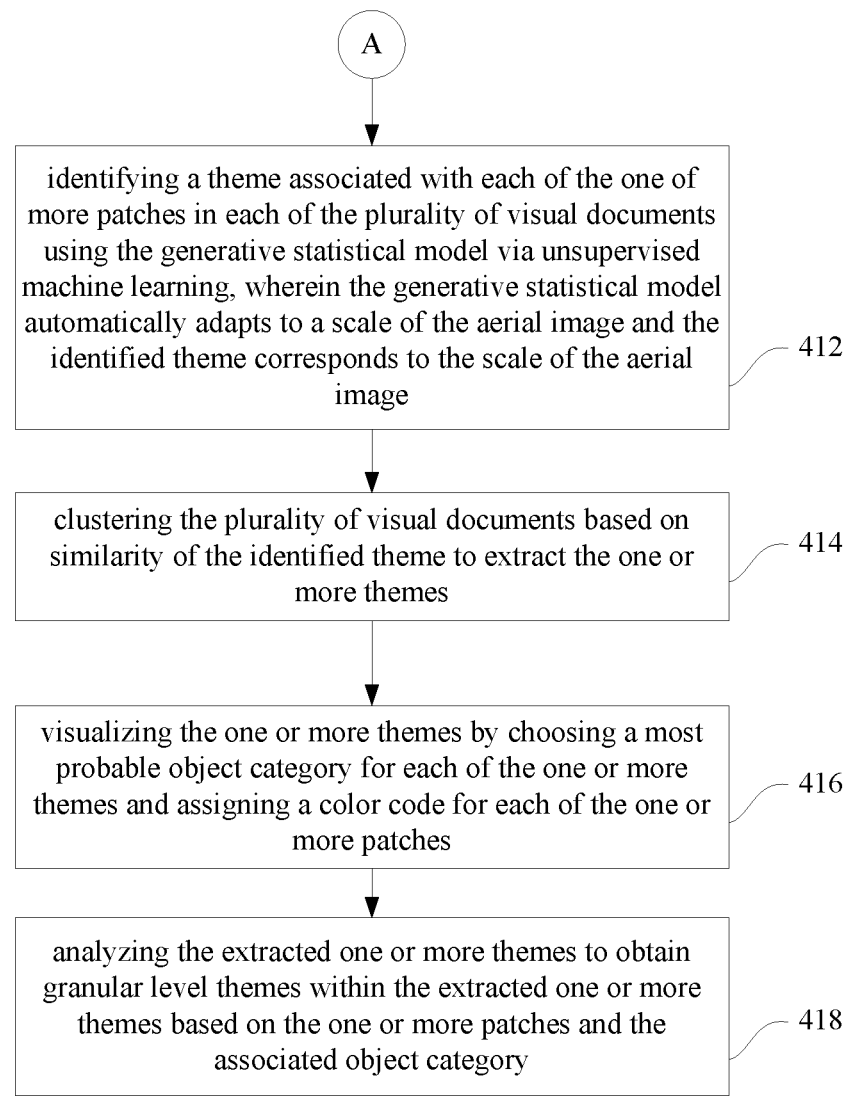

FIG. 4A through FIG. 4B illustrates an exemplary flow diagram for a computer implemented method 400 for theme extraction, in accordance with an embodiment of the present disclosure. The method 400 may be described in the general context of computer executable instructions. Generally, computer executable instructions may include routines, programs, objects, components, data structures, procedures, modules, functions, etc., that perform particular functions or implement particular abstract data types. The method 400 may also be practiced in a distributed computing environment where functions are performed by remote processing devices that are linked through a communication network. The order in which the method 400 is described is not intended to be construed as a limitation, and any number of the described method blocks may be combined in any order to implement the method 400, or an alternative method. Furthermore, the method 400 may be implemented in any suitable hardware, software, firmware, or combination thereof.

Figure 5:
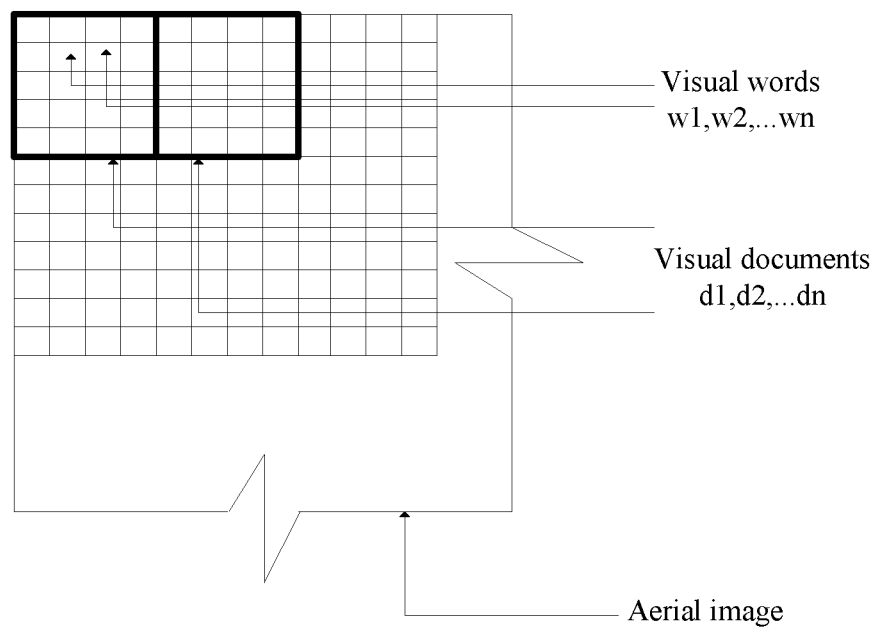
FIG. 5 is a schematic representation of a hierarchy of an aerial image, themes and object categories that define a generative statistical model, in accordance with an embodiment of the present disclosure.

In accordance with an embodiment of the present disclosure, one or more hardware processors 202 comprised in the system 200 may be configured to receive, at step 402, an aerial image pertaining to an observation area. In accordance with the present disclosure, the one or more hardware processors 202 are configured to define, at step 404, a generative statistical model wherein the aerial image is modelled as a collection of the one or more themes and each of the one or more themes is modelled as a collection of object categories. In accordance with an embodiment of the present disclosure, the one or more hardware processors 202 are configured to divide, at step 406, the aerial image into a plurality of non-overlapping sub-images, the plurality of non-overlapping sub-images representing a plurality of visual documents, wherein each of the plurality of visual documents has a first predefined size. Again at step 408, the one or more hardware processors 202 further divide each of the plurality of visual documents into one or more patches of a second predefined size, the one or more patches being representative of visual words. FIG. 5 is a schematic representation of a hierarchy of an aerial image, themes and object categories that define the generative statistical model, in accordance with an embodiment of the present disclosure. In an embodiment, the first predefined size and the second predefined size are determined empirically. In accordance with another embodiment, the wherein the first predefined size and the second predefined size are based on size of smallest object in the aerial image and pertaining to a theme, wherein the second predefined size represents number of rows and columns m×n based on the average length of the smallest object in the aerial image and spatial resolution of the aerial image and the first predefined size is a multiple of the second predefined size. In accordance with an embodiment of the present disclosure, the second predefined size is obtained by dividing the average length of the smallest object by the spatial resolution of the aerial image and the first predefined size is eight to ten times the second predefined size. In accordance with the present disclosure, the smallest object in the aerial image may be identified based on either statistical properties of objects comprised in the received aerial image or based on a pre-defined knowledge base of objects pertaining to the observation area.

In accordance with the present disclosure, the one or more hardware processors 202 are configured to label, at step 410, the one or more patches with an associated object category using supervised machine learning. In an embodiment, the supervised learning uses Support Vector Machines (SVM). In an embodiment the knowledge base of objects is updated based on the labelled one or more patches and the associated object category in step 410.

Further at step 412, the one or more hardware processors 202 identify a theme associated with each of the one of more patches in each of the plurality of visual documents using the generative statistical model via unsupervised machine learning. In an embodiment, the generative statistical model is Latent Dirichlet Allocation (LDA). In another embodiment, lexical chains may be employed to discover a topic model. In textual generative process, the lexical chain is a single pass clustering algorithm that begins with choosing a word in a sentence. It finds a semantic match within the scope of the sentence of a paragraph for the chosen word. If the semantic match is found then the words are grouped together. For the second word onwards, if the semantic match is not found it begins a new chain. At the end of the operation, an output in the form of a list of words which are similar is obtained. This output is the topic similar to the topic extracted using LDA as described above.

In accordance with the present disclosure, the generative statistical model automatically adapts to a scale of the aerial image and the identified theme corresponds to the scale of the aerial image. For example, if scale of the aerial image changes, the definition of object categories may change (though the generative statistical model is generic and accommodates such changes, the hierarchy does not change). The visual words and visual documents are defined in the context of the generative statistical model. For example, say, trees were an object category for a given scale of the aerial image. If the scale of the aerial image changes, the object category may now be a vegetation patch instead of the tree in the earlier scale. Likewise, an object category, car, may be become a metal patch if the scale of the aerial image comprising cars was changed. In accordance with the present disclosure, scale space becomes unimportant as the generative statistical model identifies themes appropriate for a given scale.

In accordance with the present disclosure, the step of identifying a theme associated with each of the one of more patches comprises creating a distribution vector associated with each of the identified themes in each of the plurality of visual documents, wherein the distribution vector is indicative of a statistical distribution of a corresponding theme over associated one or more patches. In an embodiment, random themes may be initially assigned to the one or more patches iteratively until the statistical distribution of the theme over the associated one or more patches is stable or there is no appreciable change between iterations depending on a pre-defined acceptable threshold for the change.

In accordance with the present disclosure, the one or more hardware processors 202 are configured to cluster, at step 414, the plurality of visual documents based on similarity of the identified theme to extract the one or more themes. In an embodiment, K-means algorithm may be used for the step of clustering and the distribution vector associated with each of the identified themes are feature vectors. In an embodiment, the similarity of the identified theme may be evaluated using Silhouette coefficient.

In accordance with the present disclosure, the one or more hardware processors 202 are configured to visualize, at step 416, the one or more themes by choosing a most probable object category for each of the one or more themes and assigning a color code for each of the one or more patches accordingly. In accordance with an embodiment, the one or more hardware processors 202 are configured to further analyze, at step 418, the extracted one or more themes to obtain granular level themes within the extracted one or more themes based on the one or more patches and the associated object category. Accordingly, in accordance with the present disclosure, for a higher level theme of say, parking lot, a granular level theme, say occupied container-parking lot may be obtained based on labelled object category containers and the themes may then be visualized based on color code provided to the object category containers.

In the present disclosure, the area image pertaining to a large coverage area is analysed by utilizing linguistic approaches to image processing. Rather than identifying the individual objects, the themes associated with the images are extracted. The extracted themes from aerial images may further be effectively utilized for various purposes such as infrastructure management, urban open space management, etc. In accordance with the present disclosure, the objects associated with the aerial images are classified by utilizing the supervised machine learning approach and the learning of generative model parameters is performed by utilizing an unsupervised machine learning approach. The combination of the supervised and the unsupervised machine learning based technique increases the efficiency of the system 200.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device may be any kind of device which may be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method for extracting one or more themes from an aerial image (400), the processor implemented method comprising the steps of: receiving, by one or more hardware processors, the aerial image pertaining to an observation area (402); defining, by the one or more hardware processors, a generative statistical model wherein the aerial image is modelled as a collection of the one or more themes and each of the one or more themes is modelled as a collection of object categories (404); dividing, by the one or more hardware processors, the aerial image into a plurality of non-overlapping sub-images, the plurality of non-overlapping sub-images representing a plurality of visual documents, wherein each of the plurality of visual documents has a first predefined size (406); dividing, by the one or more hardware processors, each of the plurality of visual documents into one or more patches of a second predefined size, the one or more patches being representative of visual words (408); labeling, by the one or more hardware processors, the one or more patches with an associated object category using supervised machine learning (410); identifying, by the one or more hardware processors, a theme associated with each of the one of more patches in each of the plurality of visual documents using the generative statistical model via unsupervised machine learning, wherein the generative statistical model automatically adapts to a change in a scale of the aerial image and the identified theme corresponds to the change in the scale of the aerial image (412); clustering, by the one or more hardware processors, the plurality of visual documents based on similarity of the identified theme to extract the one or more themes (414); and visualizing, by the one or more hardware processors, the one or more themes by choosing a most probable object category for each of the one or more themes and assigning a color code for each of the one or more patches accordingly (416).

2. The processor implemented method of claim 1 further comprising analyzing the extracted one or more themes to obtain granular level themes within the extracted one or more themes based on the one or more patches and the associated object category (418).

3. The processor implemented method of claim 1, wherein the first predefined size and the second predefined size are either (i) determined empirically or (ii) are based on size of smallest object in the aerial image and pertaining to a theme, wherein the second predefined size represents number of rows and columns m×n based on the average length of the smallest object in the aerial image and spatial resolution of the aerial image and the first predefined size is a multiple of the second predefined size.

4. The processor implemented method of claim 3, wherein the smallest object in the aerial image is identified based on either statistical properties of objects comprised in the received aerial image or based on a pre-defined knowledge base of objects pertaining to the observation area.

5. The processor implemented method of claim 3, wherein the second predefined size is obtained by dividing the average length of the smallest object by the spatial resolution of the aerial image and the first predefined size is eight to ten times the second predefined size.

6. The processor implemented method of claim 1, wherein the supervised learning uses Support Vector Machines (SVM) and the generative statistical model is Latent Dirichlet Allocation (LDA).

7. The processor implemented method of claim 1, wherein the step of identifying a theme associated with each of the one of more patches comprises creating a distribution vector associated with each of the identified themes in each of the plurality of visual documents, wherein the distribution vector is indicative of a statistical distribution of a corresponding theme over associated one or more patches.

8. The processor implemented method of claim 7, wherein the step of identifying a theme associated with each of the one of more patches comprises assigning random themes to the one or more patches iteratively until the statistical distribution of the theme over the associated one or more patches is stable.

9. The processor implemented method of claim 7, wherein the step of clustering the plurality of visual documents is based on K-means algorithm and the distribution vector associated with each of the identified themes are feature vectors.

10. The processor implemented method of claim 1, wherein the similarity of the identified theme is evaluated using Silhouette coefficient.

11. A system (200) comprising: one or more data storage devices (204) operatively coupled to one or more hardware processors (202) and configured to store instructions configured for execution by the one or more hardware processors to: receive an aerial image pertaining to an observation area; define a generative statistical model wherein the aerial image is modelled as a collection of the one or more themes and each of the one or more themes is modelled as a collection of object categories; divide the aerial image into a plurality of non-overlapping sub-images, the plurality of non-overlapping sub-images representing a plurality of visual documents, wherein each of the plurality of visual documents has a first predefined size; divide each of the plurality of visual documents into one or more patches of a second predefined size, the one or more patches being representative of visual words; label the one or more patches with an associated object category using supervised machine learning; identify a theme associated with each of the one of more patches in each of the plurality of visual documents using the generative statistical model via unsupervised machine learning, wherein the generative statistical model automatically adapts to a change in a scale of the aerial image and the identified theme corresponds to the change in the scale of the aerial image; cluster the plurality of visual documents based on similarity of the identified theme to extract the one or more themes; and visualize the one or more themes by choosing a most probable object category for each of the one or more themes and assigning a color code for each of the one or more patches accordingly.

12. The system of claim 11, wherein the one or more hardware processors are further configured to analyze the extracted one or more themes to obtain granular level themes within the extracted one or more themes based on the one or more patches and the associated object category.

13. The system of claim 11, wherein the first predefined size and the second predefined size are either (i) determined empirically or (ii) are based on size of smallest object in the aerial image and pertaining to a theme, wherein the second predefined size represents number of rows and columns m×n based on the average length of the smallest object in the aerial image and spatial resolution of the aerial image and the first predefined size is a multiple of the second predefined size.

14. The system of claim 13, wherein the smallest object in the aerial image is identified based on either statistical properties of objects comprised in the received aerial image or based on a pre-defined knowledge base of objects pertaining to the observation area.

15. The system of claim 13, wherein the second predefined size is obtained by dividing the average length of the smallest object by the spatial resolution of the aerial image and the first predefined size is eight to ten times the second predefined size.

16. The system of claim 11, wherein the supervised learning uses Support Vector Machines (SVM), the generative statistical model is Latent Dirichlet Allocation (LDA) and the similarity of the identified theme is evaluated using Silhouette coefficient.

17. The system of claim 11, wherein the one or more hardware processors are further configured to identify a theme associated with each of the one of more patches by creating a distribution vector associated with each of the identified themes in each of the plurality of visual documents, wherein the distribution vector is indicative of a statistical distribution of a corresponding theme over associated one or more patches.

18. The system of claim 17, wherein the one or more hardware processors are further configured to identify a theme associated with each of the one of more patches by assigning random themes to the one or more patches iteratively until the statistical distribution of the theme over the associated one or more patches is stable.

19. The system of claim 17, wherein the one or more hardware processors are further configured to cluster the plurality of visual documents is based on K-means algorithm and the distribution vector associated with each of the identified themes are feature vectors.

20. A non-transitory computer program product comprising a non-transitory computer readable medium having a computer readable program embodied therein, wherein the computer readable program, when executed on a computing device, causes the computing device to: receive an aerial image pertaining to an observation area; define a generative statistical model wherein the aerial image is modelled as a collection of the one or more themes and each of the one or more themes is modelled as a collection of object categories; divide the aerial image into a plurality of non-overlapping sub-images, the plurality of non-overlapping sub-images representing a plurality of visual documents, wherein each of the plurality of visual documents has a first predefined size; divide each of the plurality of visual documents into one or more patches of a second predefined size, the one or more patches being representative of visual words; label the one or more patches with an associated object category using supervised machine learning; identify a theme associated with each of the one of more patches in each of the plurality of visual documents using the generative statistical model via unsupervised machine learning, wherein the generative statistical model automatically adapts to a change in a scale of the aerial image and the identified theme corresponds to the change in the scale of the aerial image; cluster the plurality of visual documents based on similarity of the identified theme to extract the one or more themes; visualize the one or more themes by choosing a most probable object category for each of the one or more themes and assigning a color code for each of the one or more patches accordingly; and analyze the extracted one or more themes to obtain granular level themes within the extracted one or more themes based on the one or more patches and the associated object category.

\* \* \* \* \*